United States Patent [19]

Woskov et al.

[11] Patent Number: 5,573,339
[45] Date of Patent: Nov. 12, 1996

[54] ACTIVE RADIOMETER FOR SELF-CALIBRATED FURNACE TEMPERATURE MEASUREMENTS

[75] Inventors: Paul P. Woskov, Bedford; Daniel R. Cohn, Chestnut Hill, both of Mass.; Charles H. Titus, Newtown Square; J. Kenneth Wittle, Chester Springs, both of Pa.; Jeffrey E. Surma, Kennewick, Wash.

[73] Assignees: Electro-Pyrolysis, Inc., Wayne, Pa.; Massachusetts Institute of Technology, Cambridge, Mass.; Battelle Memorial Institute, Richmond, Wash.

[21] Appl. No.: 181,706

[22] Filed: Jan. 14, 1994

[51] Int. Cl.$^6$ .................................. G01J 5/08; G01J 5/62
[52] U.S. Cl. .................... 374/126; 374/128; 374/131; 374/141
[58] Field of Search .................................. 374/126, 128, 374/130, 131, 9, 141; 250/338.1

[56] References Cited

U.S. PATENT DOCUMENTS

| | | |
|---|---|---|
| 4,235,107 | 11/1980 | Lüdeke . |
| 4,292,638 | 9/1981 | Lazarchik et al. . |
| 4,568,199 | 2/1986 | Schmidt ................................. 374/122 |
| 4,708,493 | 11/1987 | Stein ..................................... 374/126 |
| 4,919,542 | 4/1990 | Nulman et al. ...................... 374/126 |
| 4,956,538 | 9/1990 | Moslehi ............................... 374/126 |
| 4,979,133 | 12/1990 | Arima et al. ....................... 250/338.1 |
| 4,979,134 | 12/1990 | Arima et al. ......................... 374/126 |
| 4,984,902 | 1/1991 | Crowley et al. ..................... 374/126 |
| 5,029,117 | 7/1991 | Patton ................................... 374/126 |
| 5,036,289 | 7/1991 | Duran . |
| 5,255,286 | 10/1993 | Moslehi et al. .................... 250/338.1 |
| 5,305,416 | 4/1994 | Fiory .................................... 374/126 |
| 5,308,161 | 5/1994 | Stein ..................................... 374/126 |
| 5,326,173 | 7/1994 | Evans et al. ......................... 374/126 |

FOREIGN PATENT DOCUMENTS

| | | |
|---|---|---|
| 56-109844 | 8/1981 | Japan . |
| 0161521 | 10/1982 | Japan ................................... 374/126 |
| 0171643 | 10/1983 | Japan ................................... 374/126 |
| 1436180 | 5/1976 | United Kingdom .................. 374/126 |

OTHER PUBLICATIONS

Ma et al. "Night Moth Eye Window for the Millimetre and Sub-Millimetre Wave Region" Optica Acta, 30(12), 1685–1695 (1983).
J. H. Rainwater, "Radiometers: Electronic Eyes that 'See' Noise", Microwaves, pp. 58–62, Sep. 1978.
H. R. Fetterman et al., "Far-ir Heterodyne Radiometric Measurements With Quasioptical Schottky Diode Mixers", Appl. Phys. Lett., vol. 33, pp. 151–154, 1978.
M. Tumm, "Computer-aided Analysis and Design of Corrugated $TE_{11}$ to $HE_{11}$ Mode Converters In Highly Overmoded Waveguides", Intern. J. of Infrared and Millimeter Waves, vol. 6, pp. 577–597, 1985.
J. D. Kraus, "Radio Astronomy", Chapter 7 by M. E. Tiuri, Radio-Telescope Receivers, McGraw Hill, New York, 1975.
F. P. Incropera and D. P. DeWitt, "Introduction to Heat Transfer", 2nd Ed., Chapter 12, Section 12.6, John Wiley and Sons, New York, 1990.
Richard et al., "Mesure de température par radiometric hertzienne", Measures Regulation Automatisme, vol. 9, p. 85–94 (Sep. 1964).

Primary Examiner—Diego F. F. Gutierrez
Attorney, Agent, or Firm—Choate, Hall & Stewart

[57] ABSTRACT

Radiometer with a probe beam superimposed on its field-of-view for furnace temperature measurements. The radiometer includes a heterodyne millimeter/submillimeter-wave receiver including a millimeter/submillimeter-wave source for probing. The receiver is adapted to receive radiation from a surface whose temperature is to be measured. The radiation includes a surface emission portion and a surface reflection portion which includes the probe beam energy reflected from the surface. The surface emission portion is related to the surface temperature and the surface reflection portion is related to the emissivity of the surface. The simultaneous measurement of surface emissivity serves as a real time calibration of the temperature measurement.

11 Claims, 3 Drawing Sheets

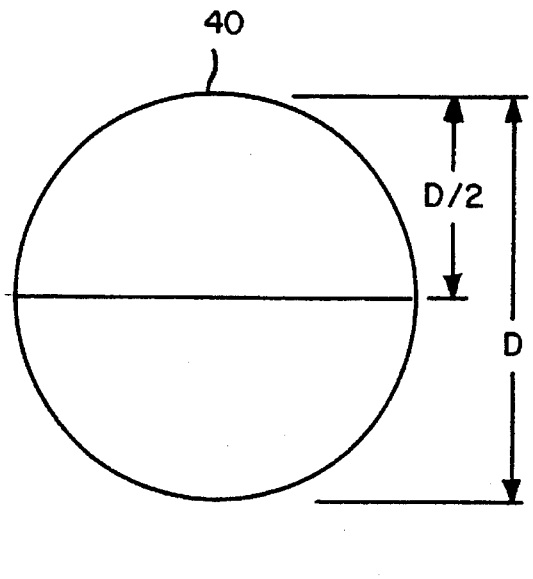
FIG.2a  FIG.2b
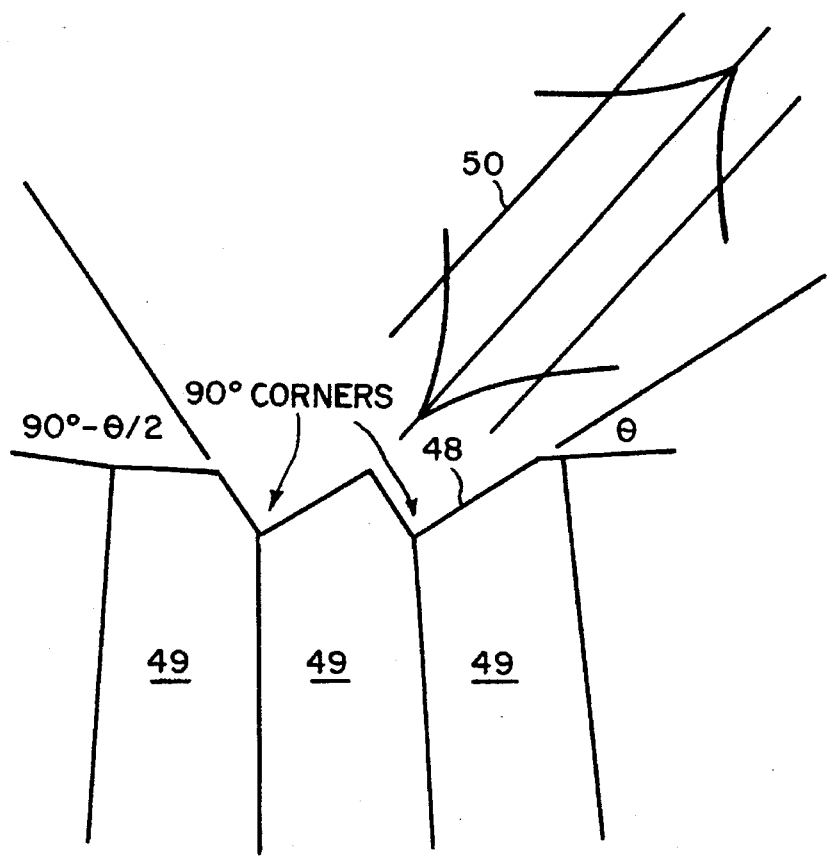
FIG. 3

ACTIVE RADIOMETER FOR SELF-CALIBRATED FURNACE TEMPERATURE MEASUREMENTS

This invention was made with government support under Contract Number DE-AC0676RLO 1830 awarded by the Department of Energy. The government has certain rights in the invention.

BACKGROUND OF THE INVENTION

This invention relates to method and apparatus for measuring the temperature of surfaces, and more particularly to the inside surfaces of an operating furnace.

There exists a need for a reliable, accurate means for measuring temperature profiles inside furnaces to monitor furnace performance and to optimize furnace operation. It is desirable that these temperature measurements be spatially resolved. Economic and environmental concerns make it critical that furnaces used in applications such as waste remediation and industrial processes be efficient with little or no hazardous emissions. Knowledge of the internal spatial temperature distribution within such a furnace is a key parameter for monitoring furnace performance and is necessary for furnace optimization.

Present temperature measurement instruments have a number of shortcomings that make them unreliable, inaccurate, or hazardous for use inside the hot, hostile environment of furnaces. For example, infrared pyrometers cannot view through smokey, hazy, and/or particle filled off-gases, their view can be further blocked by deposits on exposed viewing windows, and knowledge of surface emissivity is required to accurately interpret temperature. Other temperature sensors such as thermocouples require electrical wires being brought into the furnace which have a limited high temperature capability, are prone to failure and, would be a hazard in electric furnace applications.

SUMMARY OF THE INVENTION

A radiometer for temperature measurements according to the invention includes a heterodyne millimeter/sub-millimeter-wave receiver including a millimeter/submillimeter probe beam superimposed on its filed-of-view. Preferably the probe beam would be produced by the heterodyne receiver local oscillator. The receiver is adapted to receive radiation from a surface whose temperature is to be measured. The radiation includes a surface emission portion and a surface reflection portion which includes the probe beam energy reflected from the surface. The surface emission portion is related to the surface temperature and the surface reflection portion is related to the emissivity of the surface. In a preferred embodiment, a waveguide is provided for delivering the radiation to the receiver. A preferred waveguide is a quasi-optical graphite waveguide having internal corrugations and mirrors. In this embodiment, a further corrugated metal waveguide is provided for conversion of $TE_{11}$ to $HE_{11}$ modes. This embodiment also includes a chopper which periodically blocks the receiver field-of-view. Further, a phase splitter is provided to eliminate standing wave interference that would result from the use of a coherent probe beam. It is also preferred that the surface whose temperature is being measured include retroreflectors to insure a return reflection of the probe beam that is not sensitive to alignment.

Yet another aspect of the invention is a furnace temperature measuring system which includes a furnace having a surface whose temperature is to be measured. A waveguide is disposed within the furnace for directing radiation through a window to a heterodyne receiver disposed outside the furnace. The receiver includes a source of millimeter/sub-millimeter-wave probe beam energy, and the radiation includes a surface emission portion and a surface reflection portion which includes the probe beam energy reflected from the surface. Apparatus is provided for determining the temperature of the surface from the surface emission portion and the surface reflection portion.

Because of their long wavelength of operation, millimeter-wave radiometers can see through atmospheres that are visibly opaque such as fog and smoke. Their wavelength is still short enough for good spatial resolution. The use of a quasi-optical graphite antenna system is suitable for placement inside a hot furnace environment. Graphite components can be used at temperatures as high as 3000° C. The use of the output leakage of the radiometer's own local oscillator as a probe beam provides for a surface reflection measurement which can be related to the surface emissivity to calibrate the temperature measurement. In the prior art, an assumption had to be made about the surface emissivity of the inside furnace wall in order to interpret an output signal as temperature. Emissivity depends on temperature and on wall deposits which cannot be accurately predicted in advance. By providing a measure of emissivity, the accuracy of the radiometer of the invention is improved over the infrared pyrometers of the prior art.

BRIEF DESCRIPTION OF THE DRAWING

FIG. 2a is a plan view of a phase splitter for use in conjunction with the invention.

FIG. 2b is a cross-sectional view of the phase splitter of FIG. 2a.

FIG. 3 is a cross-sectional view of a surface whose temperature is to be measured.

DESCRIPTION OF THE PREFERRED EMBODIMENTS

Figure 1:
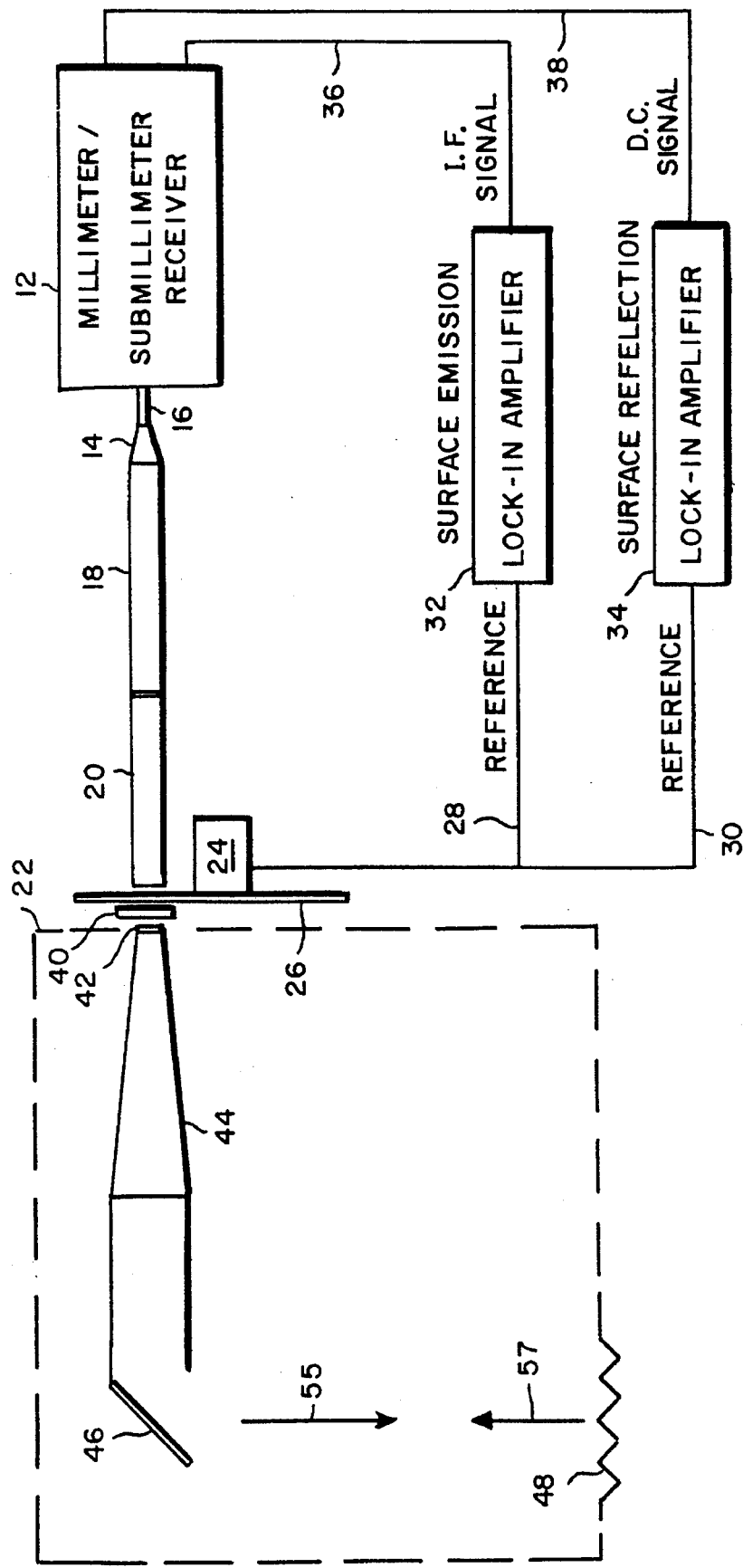
FIG. 1 is a schematic illustration of the active radiometer of the present invention.

The present invention is based on using a millimeter/sub-millimeter-wave radiometer to detect the electromagnetic radiation from furnace walls. Millimeter-wave radiometers are commonly used for measuring temperature in the environment. See, J. H. Rainwater, "Radiometers: Electronic Eyes that See Noise," *Microwaves*, pp. 58–62, September 1978. Such radiometers, however, have not been used in the hot, hostile environment present within a furnace. With reference now to FIG. 1, the active radiometer system 10 of the invention includes a millimeter/sub-millimeter-wave receiver 12. The receiver 12 receives energy through a waveguide taper and transition 14 which serves as an interface between the fundamental waveguide 16 of the receiver and a more efficient overmoded transmission line 18. This interface may also be optical, via a lens or focusing mirror if the receiver 12 mixer uses a quasi-optical antenna such as a corner cube. See, H. R. Fetterman, P. E. Tannenwald, B. J. Clifton, D. C. Parker, W. D. Fitzgerald, and N. R. Erickson, "Far-IR Heterodyne Radiometric Measurements with Quasi-optical Schottky Diode Mixers," *Appl. Phys.*

*Lett.*, Vol. 33, pp. 151–154, 1978. If a smooth walled metal waveguide such as a cylindrical copper tube as shown at 18 is used as the transmission line to propagate a transverse electric (TE) field mode, then there is a mode converter 20 to convert the TE transmission line mode to an $HE_{11}$ mode. See, M. Tumm, "Computer-aided Analysis and Design of Corrugated $TE_{11}$ to $HE_{11}$ Mode Converters in Highly Overmoded Waveguides," *Intern: J. of Infrared and Millimeter Waves*, Vol. 6, pp. 577–597, 1985. A mode converter such as the mode converter 20 is not necessary if the receiver field-of-view is already in an optical beam such as from a corner cube antenna.

The $HE_{11}$ mode, a transverse electric and magnetic field mode, is the most efficient waveguide mode that can be propagated by waveguide and efficiently couples to a free space Gaussian beam. A Gaussian beam is the best free space propagating mode for achieving diffraction limited spatial resolution. Propagating an $HE_{11}$ mode in waveguide requires either a dielectric waveguide or a corrugated internal surface for a waveguide made from a conductor material. It is the properties of the $HE_{11}$ mode which forms the basis for the use of a graphite waveguide material inside a furnace 22 and for achieving the best possible spatial resolution. The inventors herein have found that graphite is a good conductor in the millimeter/sub-millimeter wavelength range and can be made into an efficient corrugated waveguide for $HE_{11}$ mode propagation over short distances.

At the input to the mode converter 20 there is a chopper 24 which periodically blocks the receiver 12 field-of-view into the furnace 22 by means of room temperature blades 26. The blades 26 are covered with a millimeter/sub-millimeter-wave absorbing material such as Eccosorb™ to provide a room temperature black-body reference signal as in a Dicke receiver. See, J. D. Krauss, *Radio Astronomy*, Chapter 7 by M. E. Tiuri, "Radio-Telescope Receivers," McGraw Hill, New York, 1975. The chopper 24 provides reference signals 28 and 30 corresponding to the chopping frequency to lock in amplifiers 32 and 34. The lock in amplifier 32 is provided for the detection of the intermediate frequency (IF) signal 36 from the receiver 12 corresponding to surface emission and the lock in amplifier 34 is provided for the detection of the chopper modulated DC signal 38 from the receiver 12 corresponding to surface reflection. Alternatively, signal 38 could be an IF signal at a different frequency from IF signal 36 if the probe beam is at a different frequency relative to the local oscillator. A signal processor or computer 39 operates on signals from the amplifiers 32 and 34 to produce the temperature measurement. Those skilled in the art will recognize that such a signal processor or computer is well known and widely used for applications such as for the radiometer system of the invention.

A phase splitter 40 is disposed between the chopper 24 and a window 42 in a graphite waveguide 44. The phase splitter 40 will be described in more detail below in conjunction with FIGS. 2a and 2b. The window 42 spans the waveguide 44 to seal the furnace 22. The window 42 is made of a material that is transparent in the millimeter/sub-millimeter-wave range such as teflon, polyethylene, or quartz. Teflon is the preferred choice at the longer wavelength end of the millimeter/sub-millimeter-wave range because of its low index of refraction which minimizes window surface reflection losses. Window reflection losses can also further be minimized by corrugating the surfaces (See, S. J. Wilson and M. C. Hutley, "The Optical Properties of Moth Eye Antireflection Surfaces," *Optica Acta*, Vol. 29, pp. 993–1009, 1982) or Brewster's angle placement.

The corrugated $HE_{11}$ graphite waveguide 44, because of the higher resistivity of graphite, is of a larger diameter than the copper transmission line 18 to keep transmission losses low. As will be appreciated by those skilled in the art, transmission line losses are inversely proportional to the third power of the waveguide radius. Another advantage of a larger diameter waveguide at the furnace end is that the divergence of the receiver 12 field-of-view is minimized for good spatial resolution. A waveguide taper is used to increase the guide diameter. In FIG. 1, this taper is shown in the graphite waveguide 44 on the furnace side of the window 42 but it could also be made of copper on the outside of the furnace window.

Inside the furnace 22, a graphite mirror 46 is used to direct receiver 12 field-of-view toward the hot furnace surface 48 to be monitored for temperature. The graphite waveguide 44 and the mirror 46 may be rotated to scan a temperature profile. A further function of the mirror 46 is to block the window 42 from having a direct view of the hot surface 48 which keeps the window 42 cleaner and cooler. Deposits, however, on the window 42 or mirror 46 are not critical because of the millimeter/submillimeter wavelength of operation.

As will be discussed below in conjunction with FIG. 4, the receiver 12 includes a local oscillator or other source for a probe beam. The purpose of the phase splitter 40 is to compensate for the coherent nature of the probe beam. Instrumental standing wave interference effects are averaged out with the phase splitter 40. With reference now to FIGS. 2a and 2b, the phase splitter 40, preferably made of a material such as teflon, includes a step S having a dimension given by:

$$S = \frac{m}{4n\lambda}$$

where m is an odd integer (m=1, 3, 5 . . . ) preferably 1, n is the index of refraction of the phase splitter material, and λ is the wavelength in free space. The phase splitter 40 is positioned so that the step precisely cuts through the middle of the radiometer beam so that half the beam goes through the thicker part and the other half goes through the thinner part. Thus on reflection, the two halves of the beam are 180° out of phase with each other. If the top half of the beam is on an interference peak, the bottom half will be on an interference minimum, and conversely. Therefore the coherent interference in the local oscillator beam is always automatically averaged out. More than one step can be used to reduce the requirement for precise positioning of the phase splitter.

As shown in FIG. 3, the hot surface 48 whose temperature is to be measured, is preferably made up of 90° corners or retroreflectors in a refractory material such as bricks 49 used for lining the wall of the furnace 22. An orientation angle represented by θ can be skewed so that the corners are machined in a direction from which the radiometer beam 50 is coming.

The 90° corners shown in FIG. 3 do not have to be three-dimensional if the radiometer beam 50 is in the same plane as the corners. The reflectivity of a flat sample of brick material 49 is first calibrated at room temperature; then this value is used to calibrate the room temperature reflectivity of the corner reflector. The corner reflection signal is generally equal to the flat surface reflectivity squared. Alternative retroreflector designs can include focusing mirror surfaces machined into refractory material. The step of phasesplitter 40 would be oriented orthogonal to the valley of corners 48.

Figure 4:
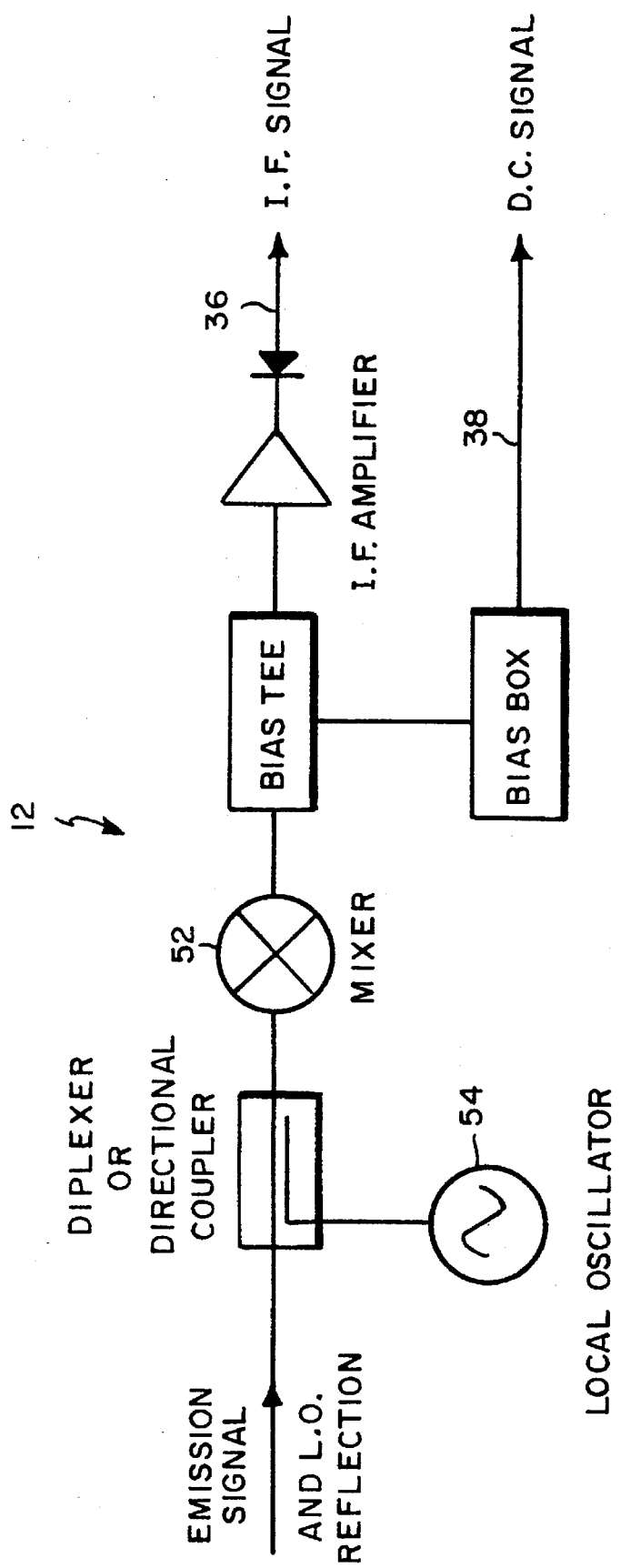
FIG. 4 is a block diagram of the millimeter/sub-millimeter receiver used in the invention.

With reference now to FIG. 4, the receiver 12 has two outputs, namely the IF signal 36 and the DC signal 38. The two outputs 36 and 38 correspond to the intermediate frequency signal and to the direct current level on a mixer 52. The IF signal 36 has a wide bandwidth (approximately 1–10 GHz) double sideband and is the down shifted emission frequency from the hot surface 48 being monitored. This signal 36 is linearly proportional to the temperature of the surface 48. Wide bandwidth operation is important for good signal-to-noise ratio since the signal-to-noise ratio is proportional to the square root of the bandwidth.

The DC signal 38 has a component that is proportional to the reflection from the hot surface 48 of a local oscillator (LO) 54 beam 55 (FIG. 1 ). The DC signal 38 is modulated by the chopper 24 and therefore is readily distinguishable from the LO and DC bias levels on the mixer 52. Importantly, the present invention takes advantage of the back reflection of a part of the local oscillator 54 signal 55 incident on the mixer 52 back along the receiver field-of-view after reflection from the hot surface 48. Alternatively, a source different from the local oscillator could be used for the probe beam. In this case signal 38 would be an IF signal with the surface reflection signal and signal 36 would be the IF signal without the surface reflection signal. The reflectivity of the hot surface is related to its emissivity through Kirchhoff's law. See, F. P. Incropera and D. P. DeWitt, *Introduction to Heat Transfer*, 2nd Ed. , Chapter 12, Section 12.6, John Wiley and Sons, New York, 1990. The emissivity of a surface must be known in order to interpret the surface emission, as measured by the surface emission IF signal, as a temperature. The present invention provides for simultaneous surface emissivity calibration.

Instead of using the phase splitter 40 to compensate for the coherent nature of the local oscillator 54 signal, an alternative scheme frequency modulates the local oscillator. The frequency sweep of the modulation should be as great as or greater than where c is the speed of light and L is the path length from the receiver 12 to the hot surface 48 which is being observed. Such a frequency sweep should be made rapidly compared to signal integration time. The received signal will then be an average of the instrumental interference peaks and minima. This alternative scheme for compensation for local oscillator 54 coherence is averaging in the time domain whereas the phase splitter 40 effects averaging in the spatial domain. A combination of both of these coherence compensation schemes may be used.

In operation, energy 57 from the hot surface 48 is directed into the graphite waveguide 44. This energy 57 is a combination of energy emitted from the hot surface 48 and portion 55 of the local oscillator 54 energy reflected from the hot surface 48. This combined emission and reflection energy 57 passes through the window 42 and phase splitter 40 and is chopped by the chopper 24. The energy proceeds through the mode converter 20 into the waveguide 18 and subsequently through the fundamental waveguide 16 to the receiver 12. The receiver 12 has an IF output 36 and a DC output 38. As stated above, the IF signal 36 is linearly proportional to the temperature of the surface and the DC signal 38 is proportional to the reflectivity of the hot surface 48. The reflectivity is related to its emissivity through Kirchhoff's law. As stated above, the IF signal 36 and the DC signal 38 are processed in the signal processor 39 to generate the temperature measurement. Thus, by monitoring a signal related to emissivity, the active radiometer of the invention is being continuously calibrated for any changes in emissivity which result from surface deposits or other factors. The present invention provides reliable, robust temperature measurement instrumentation for the monitoring, control and development of furnaces. It is recognized that modifications and variations of the invention disclosed herein will occur to those skilled in the art and it is intended that all such modifications and variations be included within the scope of the appended claims.

What is claimed is:

1. Radiometer system for temperature measurement comprising:
   a heterodyne millimeter/sub-millimeter-wave receiver including a millimeter/submillimeter-wave continuous probe beam source for generating a probe beam towards a surface whose temperature is to be measured and toward a room temperature reference, wherein said probe beam is continuously incident on said surface or said reference, the receiver adapted to receive radiation from the surface, the radiation including a surface emission portion and a surface reflection portion including the probe beam energy reflected from the surface, the surface emission portion being related to the surface temperature and the surface reflection portion being related to the emissivity of the surface, and signal processing means for determining the surface temperature only from the radiation including both the surface emission portion and the surface reflection portion.

2. The radiometer system of claim 1 where the probe beam source is a local oscillator in the receiver.

3. The radiometer system of claim 1 including a waveguide and mirror system having a waveguide and a mirror for transmitting the probe beam and delivering the radiation to the receiver.

4. The radiometer system of claim 3 wherein the waveguide is graphite.

5. The radiometer system of claim 3 wherein the mirror is graphite.

6. The radiometer system of claim 3 further including a waveguide for conversion of $TE_{11}$ to $HE_{11}$ modes.

7. The radiometer system of claim 1 including a chopper for periodically blocking the receiver field-of-view.

8. The radiometer system of claim 1 further including a phase splitter disposed for altering the phase of the radiation.

9. The radiometer system of claim 1 wherein the surface whose temperature is to be measured includes retroreflectors.

10. The radiometer system of claim 1 further including apparatus adapted to frequency modulate the probe beam.

11. Furnace temperature measuring system comprising:
   a furnace including a surface whose temperature is to be measured;
   a waveguide disposed within the furnace for directing radiation from the surface through a window to a heterodyne receiver disposed outside the furnace, the receiver including a local oscillator to generate a continuous probe beam toward the surface and toward a room temperature reference, wherein the probe beam is continuously incident on the surface or the reference and the radiation includes a surface emission portion and a surface reflection portion including the probe beam energy reflected from the surface; and
   apparatus for determining the temperature of the surface only from the radiation including both the surface emission portion and the surface reflection portion.

\* \* \* \* \*

UNITED STATES PATENT AND TRADEMARK OFFICE
CERTIFICATE OF CORRECTION

PATENT NO. : 5,573,339
DATED : November 12, 1996
INVENTOR(S) : Paul P. Woskov, et. al.

It is certified that error appears in the above-indentified patent and that said Letters Patent is hereby corrected as shown below:

Column 1, line 46: please delete "filed" and insert therefor -- field --; and

Column 2, line 35: please delete "plan" and insert therefor -- plane --.

Signed and Sealed this

Third Day of June, 1997

Attest:

BRUCE LEHMAN

*Attesting Officer*  *Commissioner of Patents and Trademarks*